United States Patent [19]
Ogasawara et al.

[11] Patent Number: 5,592,314
[45] Date of Patent: Jan. 7, 1997

[54] **TUNABLE WAVELENGTH FILTER FORMED BY 2 LCDS IN SERIES HAVING OPPOSITE TWIST ANGLES OF N*π/2 AND A DIELECTRIC MIRROR LAYER ON EACH SUBSTRATE**

[75] Inventors: Yasuyuki Ogasawara; Yoshihiko Watanabe, both of Shizuoka-ken, Japan

[73] Assignee: Yazaki Corporation, Tokyo, Japan

[21] Appl. No.: 353,205

[22] Filed: Dec. 1, 1994

[30] Foreign Application Priority Data

Dec. 2, 1993 [JP] Japan ................... 5-303042
Jun. 13, 1994 [JP] Japan ................... 6-130516

[51] Int. Cl.$^6$ ............... G02F 1/1335; G02F 1/1347; G02F 1/13; G01B 9/02
[52] U.S. Cl. ............... 349/18; 356/352; 349/74; 349/114; 349/137; 349/180
[58] Field of Search ............... 359/53, 70, 71, 359/93, 578, 39, 94; 356/352

[56] References Cited

U.S. PATENT DOCUMENTS

| | | | |
|---|---|---|---|
| 5,044,732 | 9/1991 | Kimura et al. | 359/53 |
| 5,068,749 | 11/1991 | Patel | 359/93 |
| 5,321,539 | 6/1994 | Hirabayashi et al. | 359/70 |
| 5,357,340 | 10/1994 | Zochbauer | 356/352 |

FOREIGN PATENT DOCUMENTS 1-138529 5/1989 Japan ................... 359/53
4-220618 8/1992 Japan.

OTHER PUBLICATIONS

Grischkowsky et al., "Double Fabry–Perot Filter", IBM Technical Disclosure Bulletin, vol. 14, No. 8, Jan. 1972, p. 2500.

*Primary Examiner*—Anita Pellman Gross
*Assistant Examiner*—Walter J. Malinowski
*Attorney, Agent, or Firm*—Wigman, Cohen, Leitner & Myers, P.C.

[57] ABSTRACT

A tunable wavelength filter is independent of the polarization. The filter includes first and second liquid crystal layers. Each liquid crystal layer includes two opposing glass substrates on which transparent electrodes, dielectric mirrors and alignment layers are coated in this order, respectively, and a liquid crystal interposed between the opposing alignment layers. In the first liquid crystal layer, the molecule alignment of the liquid crystal is twisted by nπ/2 radian to one twisting direction where n is a positive uneven number. In the second liquid crystal layer, the molecule alignment of the liquid crystal is twisted by –nπ/2 radian to the twisting direction. The first and second crystal layers are laid to overlap each other so that an axis of liquid crystal molecules on the emission side of the first liquid layer is perpendicular to an axis of liquid crystal molecules on the incidence side of the second liquid crystal layer.

6 Claims, 7 Drawing Sheets

TUNABLE WAVELENGTH FILTER FORMED BY 2 LCDS IN SERIES HAVING OPPOSITE TWIST ANGLES OF N*π/2 AND A DIELECTRIC MIRROR LAYER ON EACH SUBSTRATE

BACKGROUND OF THE INVENTION

The present invention relates to a tunable wavelength filter, and more particularly, it relates to a tunable wavelength filter on use of a liquid crystal étalon, which is independent of polarization.

The tunable wavelength filter is used for electing a light of desired wavelength in optical pulses of a number of wavelengths selectively in order to transmit a great capacity of informations in the field of optical communication using an optical fiber.

As the conventional tunable wavelength filter, and more particularly, as the tunable wavelength filter for multiple-communication separating wavelength, there are known a mechanically controlled grating and a Fabry-Perot étalon consisting of two adjustable mirrors mounted in parallel with each other. However, these filters contains such problems as largeness in size, requirement of high driving power, low reliability, high cost and so on.

In order to solve such problems, there was proposed a liquid crystal étalon type of tunable wavelength filter in which a liquid crystal layer is interposed between two sheets of glass substrates each of which has a surface opposing to each other and having a transparent electrode, a reflection layer and an alignment layer coated thereon. This liquid crystal étalon type of tunable wavelength filter has a potential for realizing the filter of down-sized, low electrical power and low cost.

Shown in FIG. 1 is the conventional liquid crystal étalon type of tunable wavelength filter which is disclosed in Japanese Unexamined Patent Publication (Kokai) No. 4-220618. In the figure, reference numeral 1 designates glass substrates, 2 anti-reflection coatings, 3 transparent electrodes, 4 dielectric mirrors as reflection layers, 5 alignment layers, 6 a liquid crystal, 7 a spacer and 8 a lead wire.

In the example, the liquid crystal 6 is interposed between the glass substrates 1 inside which the transparent electrodes 3, the dielectric mirrors 4 and the alignment layers 5 are laminated in sequence and oriented homogeneously so as to be in counter-parallel with each other between the glass substrates 1 in which crystal molecules oppose to each other.

FIG. 2A is a diagram showing a change of peak wavelength passing through the tunable wavelength filter of the above publication in case of changing a voltage applied on the filter, namely, a dependency of peak wavelength on voltage applied thereon. By this diagram, it will be understood that the more voltage is applied on the tunable wavelength filter, the peak-wavelength is shifted from the longer wavelength region to shorter wavelength region.

U.S. Pat. No. 5,068,749 also discloses another tunable wavelength filter which is similar to the above-mentioned filter of JPP No. 4-220618 except that crystal molecules charged between the opposing glass substrates are arranged in accordance with the twist alignment of twist of nπ/2 radian (n: a positive uneven number). FIG. 2B is a diagram showing a dependency of peak wavelength of the tunable wavelength filter disclosed in the above publication on voltage applied thereon. As will be apparent from the figure, by applying the voltage on the filter, the peak wavelength is shifted from the longer wavelength region to the shorter wavelength region. Note, throughout FIGS. 2A and 2B, curves shown with black and white square marks (□;■) designate the respective outputs of liquid crystal étalon in response to a variety of incident lights by representing a parameter of translucent wavelength for the voltage applied thereon. As shown in the figure, whatever polarization condition the incident light may take, two kinds of output curves are obtained. Besides, in case that the incident light under a linearly polarization condition impinges in parallel or vertically to the liquid crystal molecules, only single kind of output will be obtained. The reason why the two kinds of curves is because each liquid crystal molecule has a characteristic of index anisotropy that the refractive index of crystal molecules in the longitudinal direction is different from that in the latitudinal direction. Therefore, the incident light is transmitted in the liquid crystal layer at the respective indexes, so that two linearly polarizations are generated. That is, the above-mentioned two linearly polarizations correspond to the curves plotted with the marks (□;■), respectively. On the contrary, in case that it does not depend on the polarization, only one output will be obtained in any conditions of polarization. In the tunable wavelength filter disclosed in the publication JPP No. 4-220618, however, there is confirmed output lights with two kinds of curves for the incident light as shown in FIG. 2A, which depend on the polarization apparently. Therefore, in order to make the output lights independent of the polarization, it requires a polarization light split, a prism or the like, so that there are raised problems that such an instrument is apt to be large-sized and the cost thereof is increased.

On the other hand, in the filter disclosed in the publication U.S. Pat. No. 5,068,749, as shown in FIG. 2B, two curves are overlapped with each other only in a section of high-voltage, so that it represents a characteristic of independent of the polarization in the same section. However, since the filter represents a feature dependent of the polarization in the section of low-voltage, there is caused a problem that it has a narrow tunable wavelength area with a range of approximately 15 (nm) in the polarization independent area.

Next, we consider the problems which would be caused, in case that the above-mentioned conventional tunable wavelength filter is applied for a spectro-photometer. Note that, the spectro-photometer analyzes an optical light to be inspected and detects a wavelength component thereof and a strength of the detected light at mentioned wavelength. From these points of view, it is desired that the spectro-photometer analyzes the light in a broader range of wavelength and divides the light into individual wavelengths.

From the point of view, in the conventional spectro-photometer, a plurality of band-pass filter, of which translucent wavelength are continuous substantially, are so arranged in array as to form a "grating" thereby to analyze the light by the grating. Respective band-pass filters have a translucent characteristic that respective selective wavelengths are 800 nm, 810 nm, 820 nm . . . , 870 nm in order to pick up a single wavelength only.

The spectroscopic analysis by the spectro-photometer is carried out by either changing the band-pass filters to which the light is radiated, in turn, by means of moving the grating by the mechanical control or emitting the light to be measured against the whole grating.

In the conventional spectro-photometer, however, in order to pick up a light of single wavelength from the light in a wide range of wavelength area, it is necessary to move the grating with high accuracy and to improve the accuracy of the wavelength selectivity of the band-pass filter. Therefore, there are raised problems that the size and cost of spectrophotometer are increased.

Further, even if the above-mentioned tunable wavelength filter is used for the above spectro-photometer, it is impossible to realize the wavelength selectivity characteristic sufficiently because of its dependency of the polarization of light to be measured. In this case, for the purpose of independency of the polarization, since it requires the polarization split and the prism etc. and the tunable wavelength range becomes to be narrowed as mentioned above, there is caused a problem of difficulty of application for the spectrophotometer.

SUMMARY OF THE INVENTION

It is therefore an object of the present invention to provide a tunable wavelength filter which is independent of conditions of polarization of the incident light, whereby there is no need of a polarization light split and a prism, and which can expand a range of wavelength tunable in the area of independent of polarization and which can easily transmit only a single wavelength selectively.

The objects of the invention described above can be accomplished by a tunable wavelength filter of liquid crystal étalon type, the filter comprising:

- a first liquid crystal layer including two first glass substrates arranged oppositely from each other, each of the first glass substrates having an opposed surface on which a transparent electrode, a dielectric mirror and an alignment layer are coated in order, the first liquid crystal layer further including a liquid crystal interposed between the opposing alignment layers on the first glass substrates, molecule alignment of the liquid crystal being twisted by $n\pi/2$ radian, such as 90°, to one twisting direction where n is a positive uneven number; and

- a second liquid crystal layer including two second glass substrates arranged oppositely from each other, each of the second glass substrates having an opposed surface on which a transparent electrode, a dielectric mirror and an alignment layer are coated in order, the second liquid crystal layer further including another liquid crystal interposed between the opposing alignment layers on the first glass substrates, molecule alignment of the liquid crystal being twisted by $-n\pi/2$ radian, such as −90°, to the twisting direction;

wherein the first and second liquid crystal layers are laid to overlap each other so that an axis of liquid crystal molecules on the emission side of the first liquid crystal layer is perpendicular to an axis of liquid crystal molecules on the incidence side of the second liquid crystal layer.

With the arrangement mentioned above, although the respective translucent characteristics of the first and second liquid crystal layers of the filter are dependent of the polarization, there can be obtained only one translucent spectrum of the light passing through the filter where the first and second liquid crystal layers are laid to overlap each other, so that the translucent characteristic of the filter which is independent of the polarization of the incident light, can be realized.

In the present invention, each of the first and second glass substrates has an anti-reflection layer coated on an outside surface thereof which is opposite to the surface on which the transparent electrode is coated.

In the present invention, by the aid of an optical adhesive agent, the first glass substrate of the first liquid crystal layer facing to the second crystal layer may be joined to the second glass substrate of the second liquid crystal layer facing to the first crystal layer. In this case, as a matter of course, the joined first and second glass substrates are not provided on respective surfaces facing each other with the anti-reflection layer.

In the present invention, the first glass substrate facing to the second liquid crystal layer, may be identical to the second glass substrate of the second liquid crystal layer facing to the first liquid crystal layer.

Further, the first liquid crystal layer may have a thickness different from that of the second liquid crystal layer so as to shift the selective wavelengths of the first and second liquid crystal layers from each other. In such a case, only one translucent wavelength can be remained in common with the first and second liquid crystal layers.

Other objects and features of the present invention will become more fully apparent from the following description and appended claims in conjunction with the accompanying drawings.

DESCRIPTION OF THE PREFERRED EMBODIMENT

An embodiment of the present invention is now described with reference to the drawings.

Figure 3A:
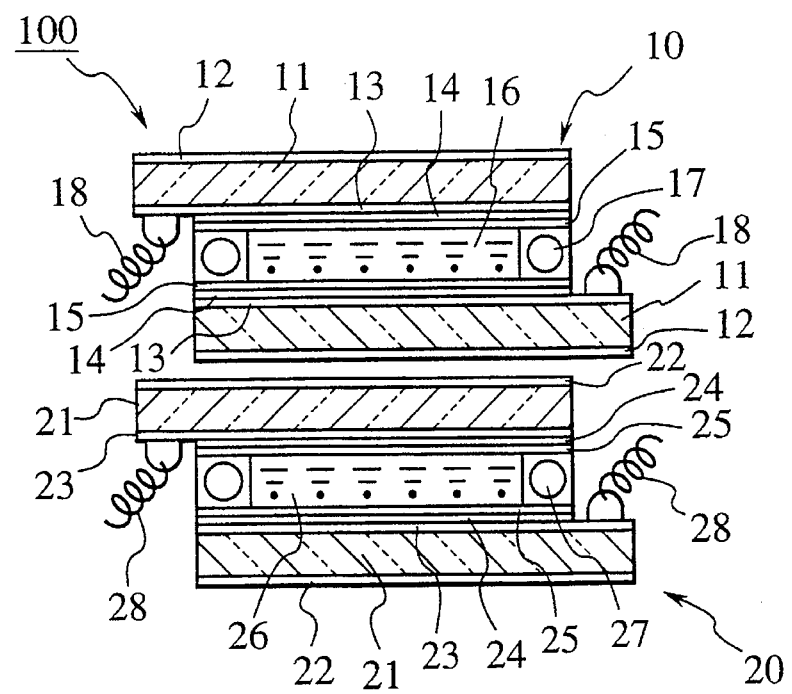
FIG. 3A is a cross sectional view showing a structure of a tunable wavelength filter of liquid crystal étalon type, in accordance with an embodiment of the present invention.

FIG. 3A shows a cross section of a tunable wavelength filter 100 in accordance with the embodiment of the present invention. The filter 100 consists of a first liquid crystal layer (assembly) 10 and second liquid crystal layer (assembly) 20 which are laid to overlap each other. The first liquid crystal layer 10 includes a pair of first glass substrates 11 which are arranged to oppose each other. Each first glass substrate 11 has a non-reflecting layers 12 coated on an outside surfaces thereof. Respectively coated on an inside surface of the first glass substrate 11, namely, an opposed surface of the substrate 11 are a transparent electrode 13, a dielectric mirror 14 as a reflection layer and an alignment layer 15, all of which are laminated in this order. Furthermore, the first liquid crystal layer 10 includes a liquid crystal 16 which is interposed between the first glass substrates 11.

Similarly, the second liquid crystal layer 20 includes a pair of first glass substrates 21 which are arranged to opposed each other. Each first glass substrate 21 has a non-reflecting layers 22 coated on an outside surfaces thereof. Respectively coated on an inside surface of the first glass substrate 21, namely, an opposed surface of the substrate 21 are a transparent electrode 23, a dielectric mirror 24 as the reflection layer and an alignment layer 25, all of which are laminated in this order. The second liquid crystal layer 20 includes a liquid crystal 26 which is interposed between the second glass substrates 21. Note, reference numerals 17 and 27 designate respective spacers and 18 and 28 lead wires.

Figure 7:
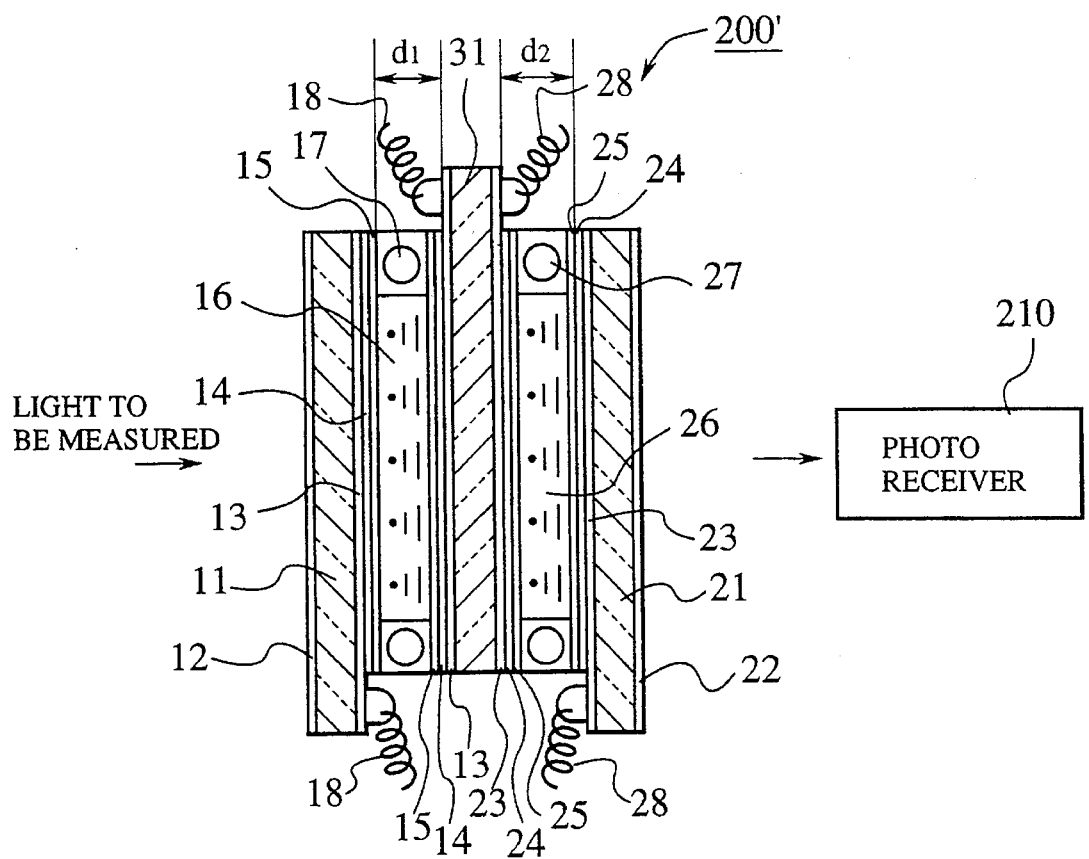
FIG. 7 is a cross sectional view showing a structure of a spectro-photometer for which the tunable wavelength filter of the present invention is applied.

Although each of the first and second liquid crystal layers 10 and 20 has a structure similar to the conventional liquid-crystal étalon type of tunable length filter shown in FIG. 7, each liquid crystal layer differs from the conventional filter in terms of alignment condition of liquid crystal molecules constituting the liquid crystals 16 and 26 interposed between the first and second glass substrates 11 and 21, respectively.

That is, in the first liquid crystal layer 10, the liquid crystal 16 arranged between the opposing alignment layers 15 has a molecular alignment twisted by only $n\pi/2$ radian wherein (n) is a positive uneven number. Similarly in the second liquid crystal layer 20, the liquid crystal 26 arranged between the opposing alignment layers 25 has also a molecular alignment twisted by only $-n\pi/2$ radian wherein (n) is a positive uneven number.

For example, in the embodiment of FIG. 3A, the first liquid crystal layer 10 is subjected to the alignment treatment twisted by 90 degrees (twisting to the left direction) and the second liquid crystal layer 20 is subjected to the alignment treatment twisted by 90 degrees (twisting to the right direction). Further, the first and second liquid crystal layers 10 and 20 are arranged in such a manner that an axis of liquid crystal molecules on the emission side of the layer 10 is perpendicular to an axis of liquid crystal molecules on the incidence side of the second liquid crystal layer 20.

As mentioned above, by overlapping two sheets of liquid crystal layers 10 and 20 each other where the respective liquid crystal layers have molecular alignments twisted by $n\pi/2$ radian, $-n\pi/2$ radian (n:positive uneven number), respectively, it is possible to realize a tunable wavelength filter independent of polarization conditions of an incident light.

Figure 4A:
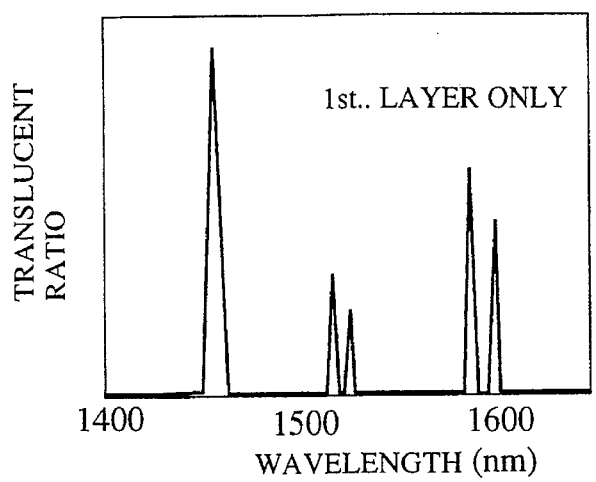
FIG. 4A is a diagram showing the translucent ratio of light for the filter of FIG. 3A, particularly, for only first liquid crystal layer thereof under condition that no voltage is applied thereon.
Figure 4B:
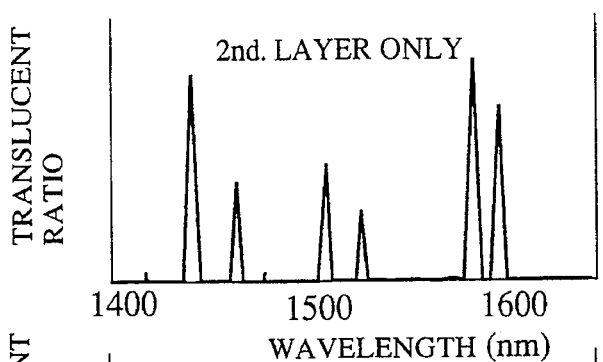
FIG. 4B is a diagram showing the translucent ratio of light for the filter of FIG. 3A, particularly, for only second liquid crystal layer thereof under condition that no voltage is applied thereon.

We now describe the characteristics of a tunable wavelength filter with reference to FIGS. 4A to 4E. In these figures, there are shown a variety of translucent characteristics, i.e., translucent ratio of elliptical polarization as the incident light in case of applying no voltage on the tunable wavelength filter 100 constructed as FIG. 3A. That is, FIG. 4A shows the translucent ratio of light of the first liquid crystal layer 10 and FIG. 4B shows the translucent ratio of light of the second liquid crystal layer 20. In FIGS. 4A and 4B, it has been found that the independent translucent characteristics of the liquid crystal layers 10 and 20 depend on the polarization and that there are two translucent spectrums about the identical wavelength.

Figure 4C:
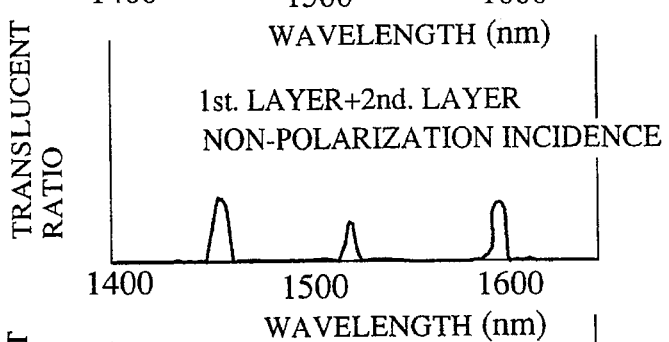
FIG. 4C is a diagram showing the translucent ratio of light with no polarization in the tunable wavelength filter in which the first and second liquid crystal layers are laid to overlap each other.

In the tunable wavelength filter 100 where the first and second liquid crystal layers (assemblies) 10 and 20 are overlapped each other as shown in FIG. 3A, however, it has been found that there is only one translucent spectrum about the identical wavelength, as shown in FIG. 4C.

Figure 4D:
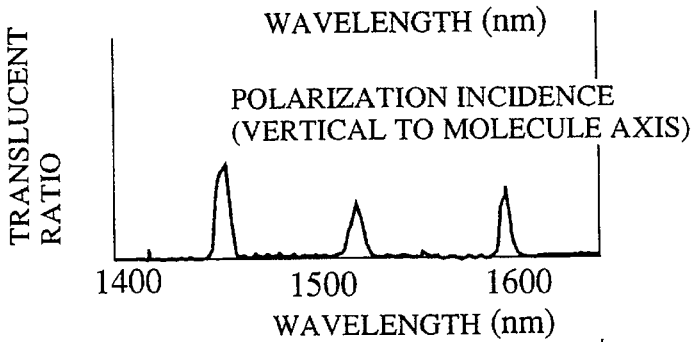
FIG. 4D is a diagram showing the translucent ratio of light in case of incidence of the polarization light vertical to an axis of liquid crystal molecules of the tunable wavelength filter in which the first and second liquid crystal layers are laid to overlap each other.
Figure 4E:
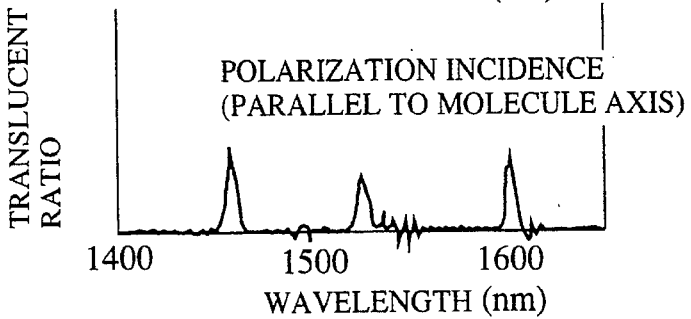
FIG. 4E is a diagram showing the translucent ratio of light in case of incidence of the polarization light in parallel with the axis of liquid crystal molecules of the tunable wavelength filter in which the first and second liquid crystal layers are laid to overlap each other.

Further, it has also been found that there is no change in translucent spectrum in case of incidence of the polarization light vertical to the axis of liquid crystal molecules as shown in FIG. 4D and in case of incidence of the polarization light in parallel with the axis of liquid crystal molecules as shown in FIG. 4E, on condition that the incident light is the straight polarization light.

Figure 1:
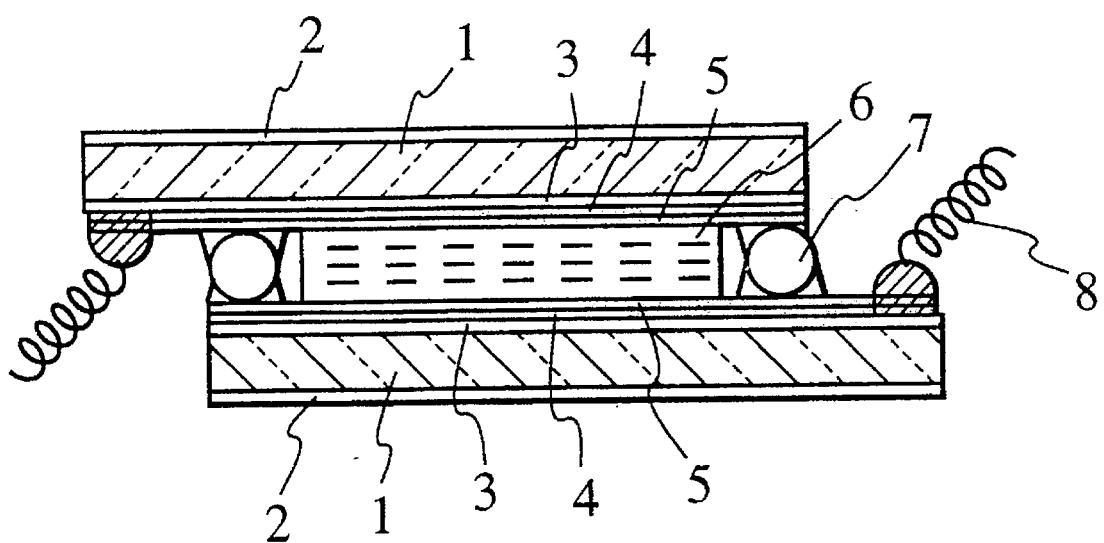
FIG. 1 is a cross sectional view showing a structure of the conventional tunable wavelength filter of liquid crystal étalon type.
Figure 2A:
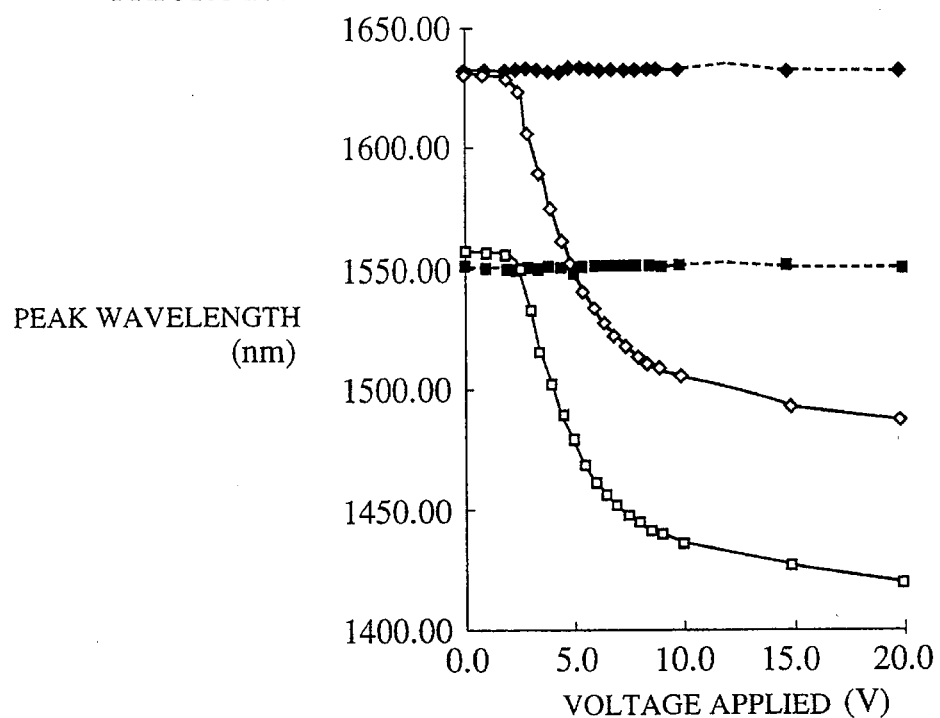
FIG. 2A is a diagram showing a dependency of peak wavelength of the conventional tunable wavelength filter of FIG. 1 upon a voltage applied thereon.
Figure 2B:
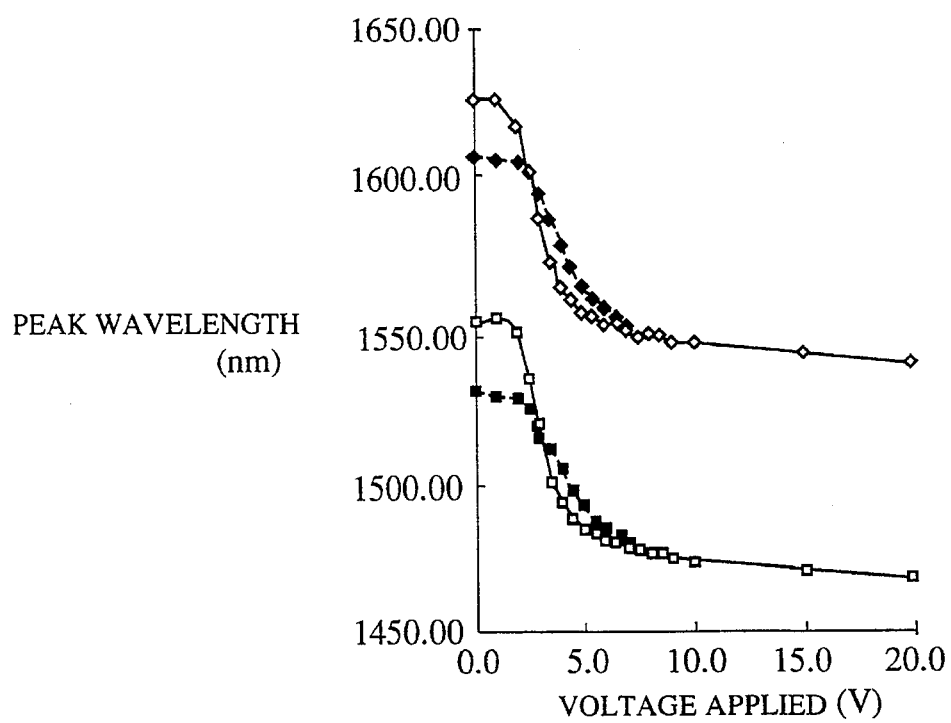
FIG. 2B is a diagram showing a dependency of peak wavelength of another conventional tunable wavelength filter upon a voltage applied thereon.
Figure 5:
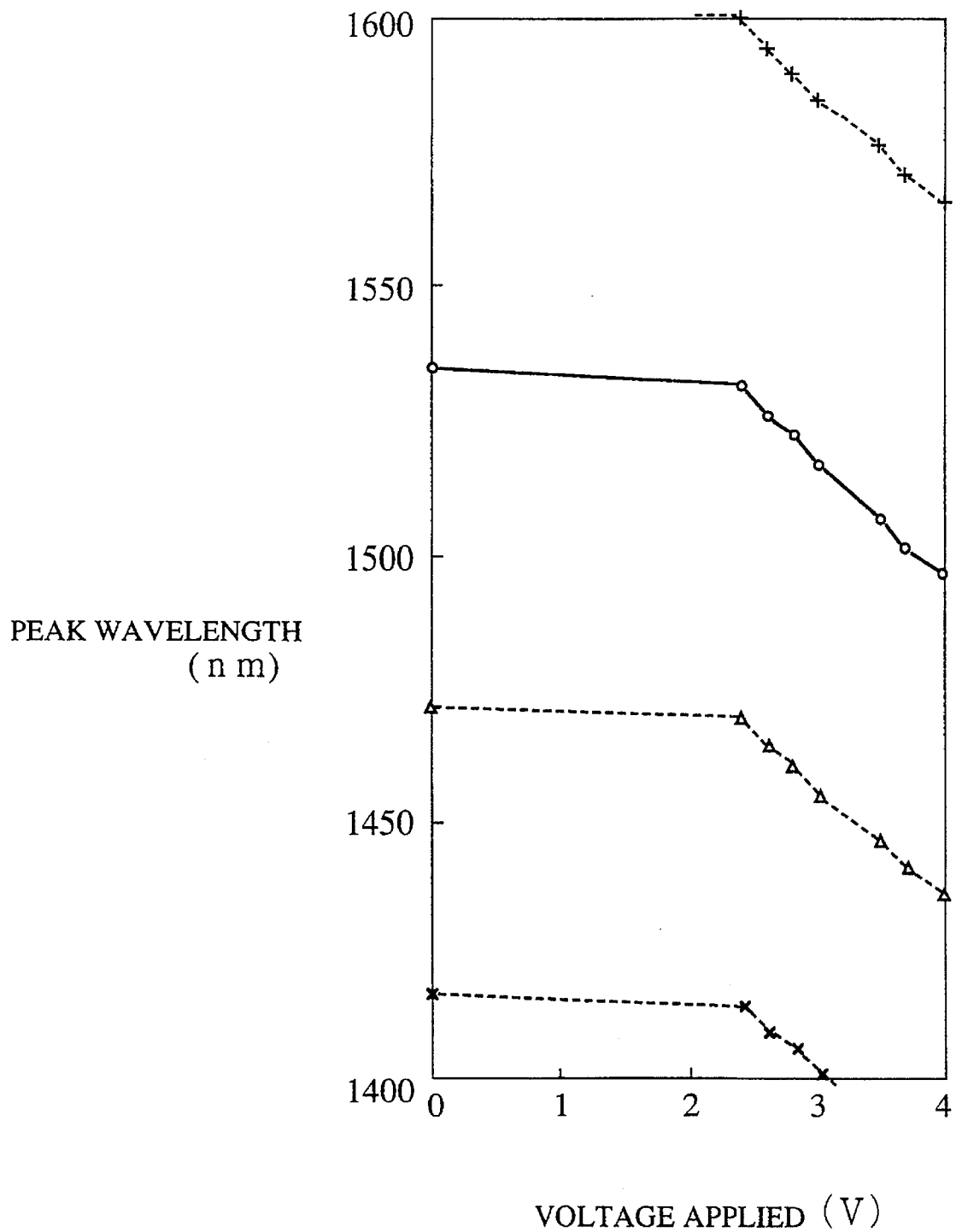
FIG. 5 is a diagram showing a relationship between the applied voltage and the peak wavelength under condition that the voltage is applied between lead wires of the filter of FIG. 3A.

Under condition that the voltage is applied between the respective leads 18 and 28 in the tunable wavelength filter 100 shown in FIG. 3A, FIG. 5 shows a relationship between the applied voltage and its peak wavelength. From FIG. 5, it has been found that, if the applied voltage is in excess of a predetermined value, the translucent spectrum changes (more than 30 nm) as the voltage is increased. Further, it should be noted that there is observed only one kind of changeful curve of the translucent spectrum in FIG. 5, different from curves of the translucent spectrum of the conventional tunable wavelength filter shown in FIGS. 2A and 2B.

From this point of view, it will be easily understood that the tunable wavelength filter 100 of FIG. 3A does not depend on the polarization conditions of incident lights perfectly.

In the above description, the tunable wavelength filter 100 of FIG. 3A is constituted by overlapping the first and second liquid crystal layers 10 and 20 which are not identical to each other. However, as the modified embodiment, upon deleting the non-reflecting layers 12 and 22, one of the first glass substrates 11, which faces to the second liquid crystal layer 20, may be joined to one of the second glass substrates 21 by means of an optical adhesive agent 29, as shown in the tunable wavelength filter 100' of FIG. 3B. Further, as shown in the tunable wavelength filter 200' of FIG. 6 in accordance with the second embodiment of the invention, the adjacent first and second glass substrates 11 and 21 of FIG. 3B may be replaced with a glass substrate 31. In this case, it will be necessary that the central glass substrate 31 has the transparent electrodes 23 and 13, the dielectric mirrors 14 and 24 as the reflection layers, and the alignment layers 15 and 25 laminated on both surfaces thereof, in this order.

Figure 3B:
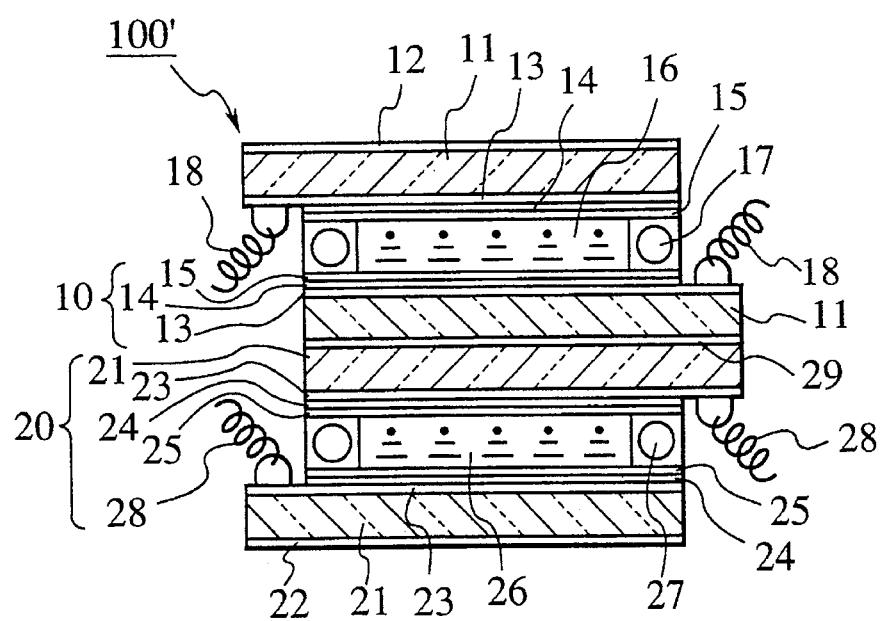
FIG. 3B is a cross sectional view showing a structure of a tunable wavelength filter of liquid crystal étalon type, in accordance with a modified embodiment of the present invention.
Figure 6:
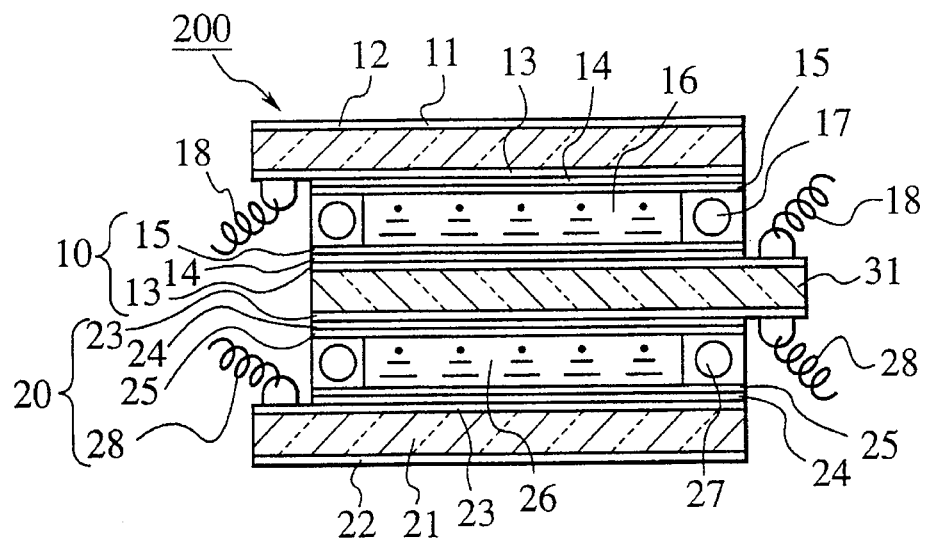
FIG. 6 is a cross sectional view showing a structure of a tunable wavelength filter in accordance with another embodiment of the present invention.

In common with the filter 100, 100' and 200 of FIGS. 3A, 3B and 6, the liquid crystal 16 of the first liquid crystal layer 10 is twisted to the left direction and the liquid crystal 26 of the second liquid crystal layer 20 is twisted to the right direction. However, it goes without saying that if only the molecule axis of liquid crystal of the first layer 10 on the emitting side thereof is perpendicular to the molecule axis of liquid crystal of the second layer 20 on the incidental side thereof, the liquid crystal 16 of the first liquid crystal layer 10 may be twisted to the right direction and the liquid crystal 26 of the second liquid crystal layer 20 may be twisted to the left direction.

In this way, since the tunable wavelength filter of the invention does not depend on the polarization, there is no need to divide the incident light into the polarization components by using the polarization beam splitter, the prism or the like. Consequently, the filter of the invention is effective for down-sizing of the unit and reduction in cost thereof and the reliability of optical signal processing can be improved.

In addition, since the tunable wavelength filter is capable of expanding a range of tunable wavelength thereof at least twice as wide as that of the conventional filter, it allows the number of transmitting channels in the optical signal field to be increased.

We now describe an application of the tunable wavelength filter of the invention for the spectro-photometer with reference to FIG. 7. Note, in this figure, elements similar to those in FIG. 6 are indicated with the same reference numerals, respectively. The tunable wavelength filter 200' in accordance with the second embodiment, which is used for a spectrometer for analyzing the light to be measured, is adapted so as to be selectively pervious to specific light of optional wavelength out of the light emitted from one side thereof and to emit it to a photo-receiver arranged on the other side.

Although each of the liquid crystal layers 16 and 26 has a molecule alignment similar to that mentioned before, the layers 16 and 26 have different thicknesses d1 and d2, respectively, to be pervious to only single wavelength selectively.

The wavelength $\lambda$ to which the tunable wavelength filter 200' is pervious is determined by a resonant condition expressed by $\lambda=2nd/m$ (n: refractive index of liquid crystal). According to the resonant condition, under both conditions that the voltage is applied and not applied on the tunable wavelength filter 200', it is pervious to lights having a plurality of wavelengths corresponding to a number of (m). Therefore, according to the embodiment, by establishing the thicknesses d of the liquid crystals 16 and 26 from each other, the resonant conditions thereof can be changed to shift the respective translucent wavelengths from each other. consequently, it is possible to remain one translucent wavelength which is in common with the respective translucent wavelengths of the liquid crystals 16 and 26 and which can pass through the liquid crystals 16 and 26.

Figure 8A:
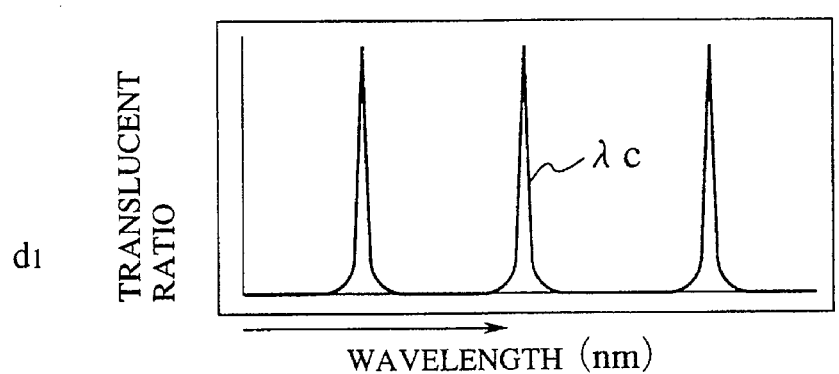
FIG. 8A is a diagram showing a relationship between the translucent ratio and the peak wavelength of the filter of FIG. 7, particularly, the peak wavelength of the liquid crystal 16 of thickness $d_1$.
Figure 8B:
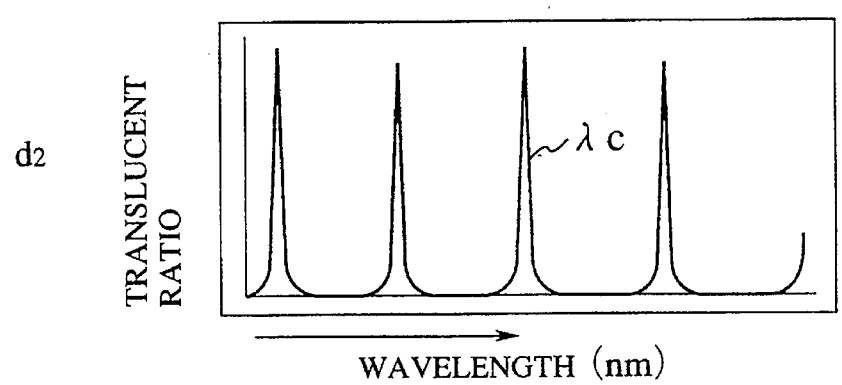
FIG. 8B is a diagram showing a relationship between the translucent ratio and the peak wavelength of the filter of FIG. 7, particularly, the peak wavelength of the liquid crystal 26 of thickness $d_2$.
Figure 8C:
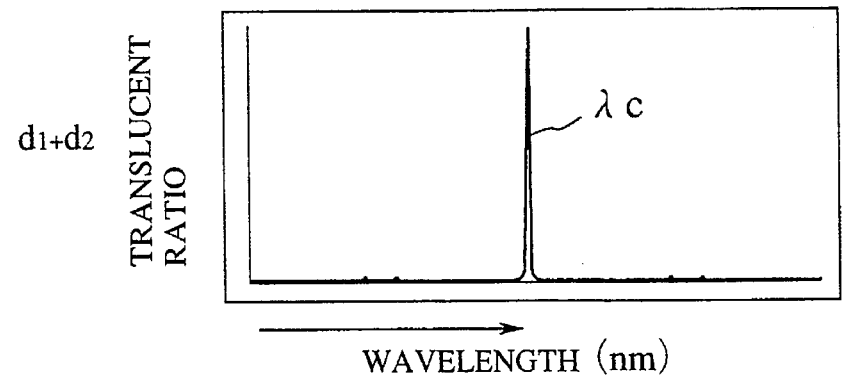
FIG. 8C is a diagram showing the translucent ratio of peak wavelength which can pass through the both liquid crystals 16 and 26.

It should be noted that there can be established a relationship between the thicknesses $d_1$ and $d_2$ as below:

$$d_1/m_1=d_2/m_2=\lambda/(2n)$$

wherein $m_1$: an integral number $m_2$: an integral number $m_1/m_2$: not an integral number For example, in case of using the filter as a photometer for lights in the visible range (400 nm to 800 nm), it has been found that if the following conditions of $d_1$=9.18 µm, $m_1$=26, $d_2$=6.81 µm, $m_2$=17 are established for the liquid crystal having the refractive index of 1.71 under condition that no voltage is applied thereon, such a filter can be pervious to the light of single wavelength. FIGS. 8A to 8C are diagrams which support the above mentioned test results. In these figures, FIG. 8A is a characteristic diagram showing a relationship between the wavelength of the liquid crystal 16 of thickness d1 and the translucent ratio. Similarly, FIG. 8B is a characteristic diagram showing a relationship between the wavelength of the liquid crystal 26 of thickness $d_2$ and the translucent ratio and FIG. 8C is a characteristic diagram showing the translucent ratio of wavelength which can pass through both of the liquid crystals 16 and 26. As shown in FIG. 8A and FIG. 8B, the wavelengths that the liquid crystals 16 and 26 can transmit are different from each other except the center wavelength $\lambda$ c. In other words, only the center wavelength $\lambda$ c is common with both of the liquid crystals 16 and 26, so that only the wavelength $\lambda$ c can pass through the liquid crystals 16 and 26, independent of the polarization.

As mentioned above, since the translucent spectrum varies corresponding to an increase of voltage under condition that the applied voltage is in excess of a constant value, it is possible to analyze the lights in a wide range of wavelengths and with a narrow width thereof, so that the down-sizing of unit and reduction in cost and weight thereof can be improved.

Although the above mentioned tunable wavelength filter 200' is based on the structure of the filter 200 shown in FIG. 6, other structures, such as the structures shown in FIGS. 3A and 3B, may be applicable for the filter 200'.

Finally, it will be understood by those skilled in the art that the foregoing description of the preferred embodiments of the disclosed structure, and that various changes and modifications may be made to the present invention without departing from the spirit and scope thereof.

What is claimed is:

1. A tunable wavelength filter of liquid crystal étalon type, said filter comprising:

a first liquid crystal layer including two first glass substrates arranged oppositely from each other, each of said first glass substrates having an opposed surface on which a transparent electrode, a dielectric mirror and an alignment layer are coated in order, said first liquid crystal layer further including a liquid crystal interposed between said opposing alignment layers of said first glass substrates, molecule alignment of said liquid crystal being twisted by nπ/2 radian to one twisting direction where n is a positive uneven number; and a second liquid crystal layer including two second glass substrates arranged oppositely from each other, each of said second glass substrates having an opposed surface on which a transparent electrode, a dielectric mirror and an alignment layer are coated in order, said second liquid crystal layer further including another liquid crystal interposed between said opposing alignment layers of said second glass substrates, molecule alignment of said liquid crystal being twisted by $-n\pi/2$ radian to said twisting direction where n is a positive uneven number;

wherein said first and second liquid crystal layers are laid to overlap each other so that an axis of liquid crystal molecules on the emission side of said first liquid crystal layer is perpendicular to an axis of liquid crystal molecules on the incidence side of said second liquid crystal layer.

2. A tunable wavelength filter as claimed in claim 1, wherein each of said first and second glass substrates has an anti-reflection layer coated on an outside surface which is opposite to said opposed surface on which said transparent electrode is coated.

3. A tunable wavelength filter as claimed in claim 1, further including an optical adhesive agent which is used to join the one of said first glass substrates facing to said second crystal layer to the one of said second glass substrates thereof.

4. A tunable wavelength filter as claimed in claim 1, wherein the one of said first glass substrates facing to the one of said second glass substrates of said second liquid crystal layer is identical to said one of second glass substrates.

5. A tunable wavelength filter as claimed in claim 1 or 4, wherein said first liquid crystal layer has a thickness different from that of said second liquid crystal layer so as to shift the selective wavelengths of said first and second liquid crystal layers from each other, whereby only one translucent wavelength can remain in common with said first and second liquid crystal layers.

6. A tunable wavelength filter as claimed in claim 1 or 4, wherein, in said first liquid crystal, said molecule alignment of liquid crystal is twisted by 90° to said twisting direction and wherein, in said second liquid crystal, said molecule alignment of liquid crystal is twisted by −90° to said twisting direction.

* * * * *